United States Patent
Malhotra (10) Patent No.: US 7,452,625 B2
(45) Date of Patent: *Nov. 18, 2008

(54) WATER MANAGEMENT IN A DIRECT METHANOL FUEL CELL SYSTEM

(75) Inventor: Sanjiv Malhotra, Castro Valley, CA (US)

(73) Assignee: Oorja Protonics, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/861,281

(22) Filed: Jun. 4, 2004

(65) Prior Publication Data

US 2005/0008923 A1 Jan. 13, 2005

Related U.S. Application Data

(60) Provisional application No. 60/480,148, filed on Jun. 20, 2003.

(51) Int. Cl.
*H01M 2/14* (2006.01)
*H01M 8/04* (2006.01)
*H01M 8/12* (2006.01)
*H01M 8/10* (2006.01)
*H01M 8/18* (2006.01)

(52) U.S. Cl. .................. 429/38; 429/20; 429/24; 429/26; 429/32; 429/39

(58) Field of Classification Search .............. None
See application file for complete search history.

(56) References Cited

U.S. PATENT DOCUMENTS

| | | | |
|---|---|---|---|
| 5,795,668 A | 8/1998 | Banerjee | 429/33 |
| 6,460,733 B2 | 10/2002 | Acker et al. | 222/94 |
| 6,492,052 B2 | 12/2002 | Ren | 429/33 |
| 6,544,677 B2 | 4/2003 | Matejcek | 429/20 |
| 6,565,998 B2 | 5/2003 | Matejcek et al. | 429/22 |
| 6,566,003 B2 | 5/2003 | Acker | |
| 6,579,331 B1 | 6/2003 | Ho | 48/198.3 |
| 6,589,679 B1 | 7/2003 | Acker et al. | 429/22 |
| 6,635,103 B2 | 10/2003 | Sirkar et al. | 95/44 |
| 7,097,930 B2 * | 8/2006 | Malhotra | 429/38 |
| 7,147,955 B2 | 12/2006 | Adams | |
| 2002/0071979 A1 * | 6/2002 | DuBose et al. | 429/26 |
| 2002/0102451 A1 | 8/2002 | Acker et al. | 429/33 |
| 2002/0106542 A1 | 8/2002 | Matejcek et al. | 429/22 |
| 2002/0127451 A1 | 9/2002 | Cao et al. | 429/30 |
| 2003/0003341 A1 | 1/2003 | Kinkelaar et al. | 429/34 |

(Continued)

*Primary Examiner*—Jonathan Crepeau
*Assistant Examiner*—Robert Hodge
(74) *Attorney, Agent, or Firm*—Lumen Patent Firm (57) ABSTRACT

A compact water management module for a direct methanol fuel cell (DMFC) system is provided. The module is a set of plates, typically two or more plates. Two of the plates are sandwiched together and enclose a membrane. The membrane is permeable to air or to water vapor. In another embodiment, both membranes are utilized. The cathode output stream of the DMFC stack feeds into one of the plates. One output of the module is water that is re-used as anode input stream to the DMFC stack. Another output of the module is the unused air that is vented out. The module is an elegant solution that improves the overall efficiency of a DMFC system. In addition, the module is small in size and can easily be stacked and integrated with a DMFC stack, a mixing device, a carbon dioxide separation device and/or a methanol source.

4 Claims, 11 Drawing Sheets

U.S. PATENT DOCUMENTS

| | | | |
|---|---|---|---|
| 2003/0031908 A1* | 2/2003 | Bostaph et al. | 429/30 |
| 2003/0157395 A1 | 8/2003 | Ren et al. | 429/44 |
| 2003/0157396 A1 | 8/2003 | Beckmann et al. | 429/44 |
| 2003/0170524 A1 | 9/2003 | Kordesch et al. | 429/34 |
| 2004/0001991 A1 | 1/2004 | Kinkelaar et al. | 429/38 |

* cited by examiner

WATER MANAGEMENT IN A DIRECT METHANOL FUEL CELL SYSTEM

CROSS-REFERENCE TO RELATED APPLICATIONS

This application is cross-referenced to and claims priority from U.S. Provisional Application 60/480,148 filed Jun. 20, 2003, which is hereby incorporated by reference.

FIELD OF THE INVENTION

The present invention relates generally to direct methanol fuel cells. More particularly, the present invention relates to water management in direct methanol fuel cells.

BACKGROUND

A direct methanol fuel cell (DMFC), like an ordinary battery, provides dc electricity from two electrochemical reactions. These reactions occur at electrodes to which reactants are continuously fed. The negative electrode (anode) is maintained by supplying a fuel such as methanol, whereas the positive electrode (cathode) is maintained by the supply of oxygen or air. When providing current, methanol is electrochemically oxidized at the anode electro-catalyst to produce electrons, which travel through the external circuit to the cathode electro-catalyst where they are consumed together with oxygen in a reduction reaction. The circuit is maintained within the cell by the conduction of protons in the electrolyte.

A DMFC system integrates a direct methanol fuel cell with different subsystems for instance for the management of water, fuel, air, humidification and thermal condition of the system. These subsystems are aimed to improve the overall efficiency of the system, which typically suffers from kinetic constraints within both electrode reactions together with the components of the cell stack. For instance, water management issues are particularly critical for a polymer electrolyte membrane (PEM) stack used for a DMFC system. On the one hand, the DMFC stack must maintain sufficient water content to avoid membrane dehydration and to avoid dry out of the cathode catalyst layer. Membrane dehydration increases the membrane resistance while a dry cathode lowers the oxygen reduction activity of the platinum catalyst; both reduce DMFC stack performance. On the other hand and more common in practice, water management problems in a DMFC stack are more often associated with excess water in the stack rather than dry out. Excess water can interfere with the diffusion of oxygen into the catalyst layer by forming a water film around the catalyst particles (flooding). In traditional DMFC systems the fuel cell stack water content is managed by controlling the stack temperature and air flow rate by for instance an air compressor system and an air-to-air condenser. However, such systems consume large amounts of power relative to the power produced by the DMFC stack reducing the overall efficiency.

Another example of an issue with traditional DMFC systems relates to the thermal management. Typically, the thermal management is controlled by both the anode and the cathode stream. The cathode side cooling is achieved by cooling of the stack by means of the water vaporization by the air flowing through the stack. The cathode side cooling takes advantage of the high stoichiometric ratios (SR ranging from 4 to 6) and air flow rates flowing through the cathode for evaporating the water present in the cathode. The water evaporation in turn results in cooling of the stack. The exiting air saturated with water is then passed through a condenser system for the cathode side to condense the water and recycling it for replenishing the water in the anode feed. The anode side cooling is achieved by means of cooling the methanol and water mixture after it exits from the stack. This cooling radiator placed at the anode exit stream cools and condenses the liquid (methanol and water) and thus separates it from the carbon dioxide. This traditional approach for thermal management requires voluminous equipment that consumes a significant amount of power produced at the fuel cell stack for their operation and tends to reduce the overall system efficiency and system power density.

Additionally, to have a commercial fuel cell system that is water autonomous, neat or commercially available methanol should be the only fuel fed to the fuel cell. However, the neat methanol fuel needs to be strongly diluted in-situ in a bulky methanol-water mixing tank to reduce the methanol crossover across the membrane electrolyte due to concentration gradients. These problems are traditionally being addressed by either trying to develop a membrane that would restrict methanol and water permeation or by employing bulky and power consuming equipment (condensers, mixing tank, cooling fans for the condenser and heat and mass exchangers) for recycling water back to the anode from the cathode outlet stream. Due to the lack of a suitable membrane that could restrict water and methanol crossover the latter option is the preferred option. However, this approach leads to low power density as well as huge parasitic power consumption from multiple components and sub-systems constituting the balance of plant or auxiliary systems in a DMFC.

Accordingly, there is a need to develop new systems in particular related to water management that could be integrated with a direct methanol fuel cell stack and system.

SUMMARY OF THE INVENTION

The present invention is a novel and elegant solution of a compact water management module for a direct methanol fuel cell (DMFC). The apparatus provided by this invention is based on a more natural solution and avoids bulky and power consuming devices. In contrast to traditional solutions, the presently proposed module by itself does not draw any power as described in one embodiment; hence the module will improve the overall efficiency of a DMFC system. In another embodiment, a small low power suction pump could be included still significantly improving the overall efficiency of a DMFC system compared to traditional solutions. In addition, the module is small in size and can easily be stacked and integrated with a DMFC stack or system. The individual size of water management module could typically be about 27, 40 or 54 cubic inches, depending on the number of plates and type of embodiment, and in some cases even less than these dimensions.

In general, the water management apparatus or module is a set of plates, typically two or more plates, whereby two plates are sandwiched together and enclose a membrane. Each of these two plates has a flow field at the site facing and in contact with the membrane. In other words, the membrane provides a barrier between the flow fields.

In one embodiment, the membrane is permeable to air. The flow field of the second plate has an access hole at one end and an exit hole at another end. The access hole provides access for the cathode output stream of the DMFC stack. The cathode output stream includes at least unused air, water vapor and water. The exit hole outputs the cathode output stream, which substantially includes water vapor and water, but devoid of unused air. The flow field of the first plate has an exit hole to vent the unused air that permeated through the membrane.

In another embodiment, the membrane is permeable to water vapor. Here, the flow field of the first plate has an access hole at one end and an exit hole at another end. The access hole provides access for the cathode output stream of a DMFC stack. Similar to the first embodiment, the cathode output stream includes unused air, water vapor and water. However, the exit hole now outputs a stream substantially devoid of water vapor. In addition to this embodiment, the flow field of the second plate has an exit hole to output the water vapor that permeated through the membrane to an access hole of a third plate. The third plate has a flow field connected to its access hole and connected to an exit hole to output water, which is produced from water vapor by means of condensation due to over-saturation.

In yet another embodiment, a set of plates is stacked (e.g. four plates) including a membrane permeable to air and a membrane permeable to water vapor; in fact this embodiment is a combination of the two previous embodiments.

From a DMFC system perspective the water management module could be nicely integrated and stacked with a mixing device/module, a carbon dioxide separation device/module and a methanol source. Each of the other modules could also be based on a set of plates and stacked together with the DMFC stack and water management module as a compact multi-module DMFC system. The mixing device could have a first input hole connected to the exit hole of the water management module that provides water, a second input hole for input from the carbon dioxide separation device, a third input hole for input from the methanol source, and an output hole to output a mixture of the three inputs. The mixture created in the mixing device could then flow to the anode inlet of a DMFC stack.

In a DMFC system according to this invention, the integration of water management device could be further be enhanced by using special holes. For instance, through-holes could be used to connect a stream from one plate to another plate through one or more plates stacked in between those plates.

BRIEF DESCRIPTION OF THE FIGURES

The present invention together with its objectives and advantages will be understood by reading the following summary in conjunction with the drawings, in which.

DETAILED DESCRIPTION OF THE INVENTION

Figure 1:
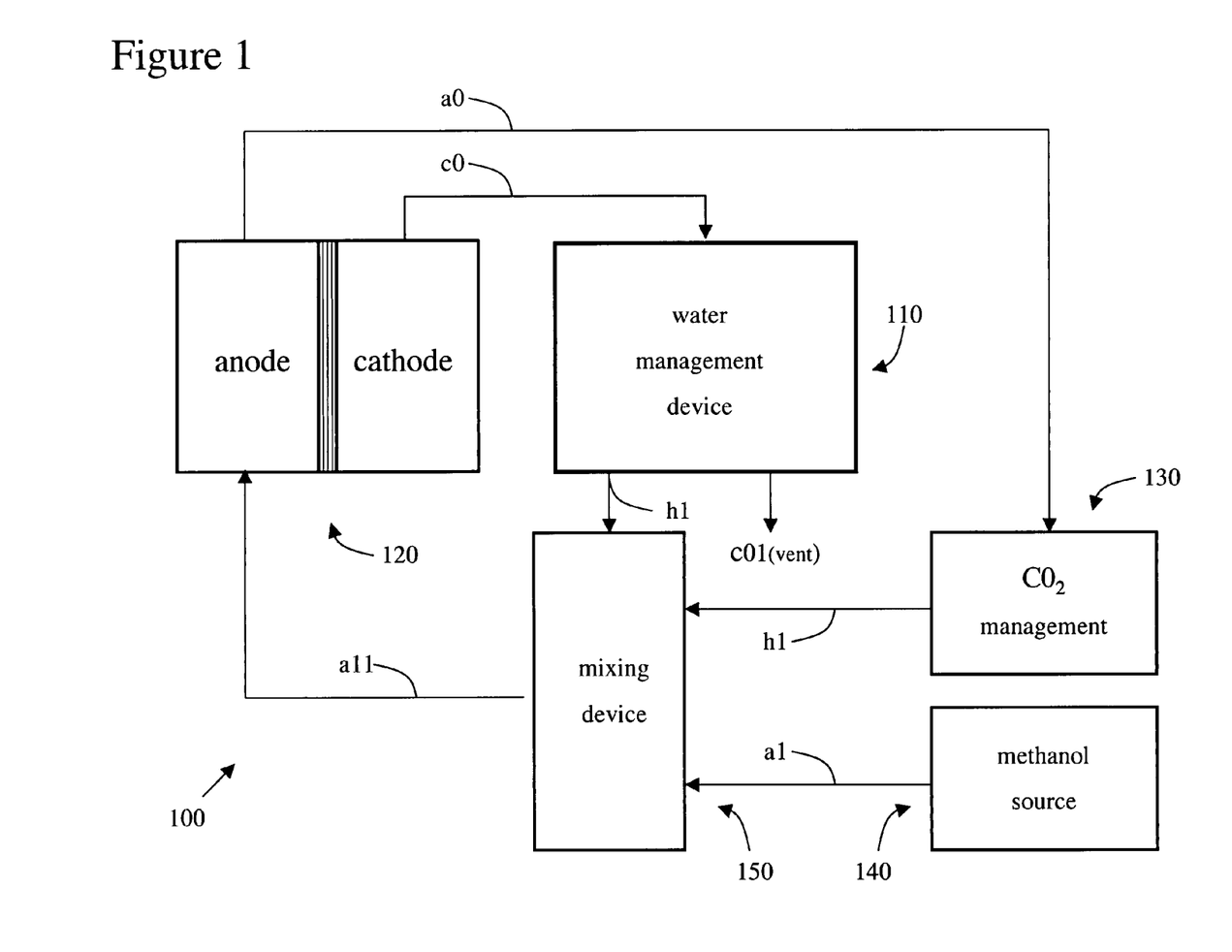
FIG. 1 shows an exemplary embodiment of a water management device as part of a DMFC system according to the present invention.
Figure 2:
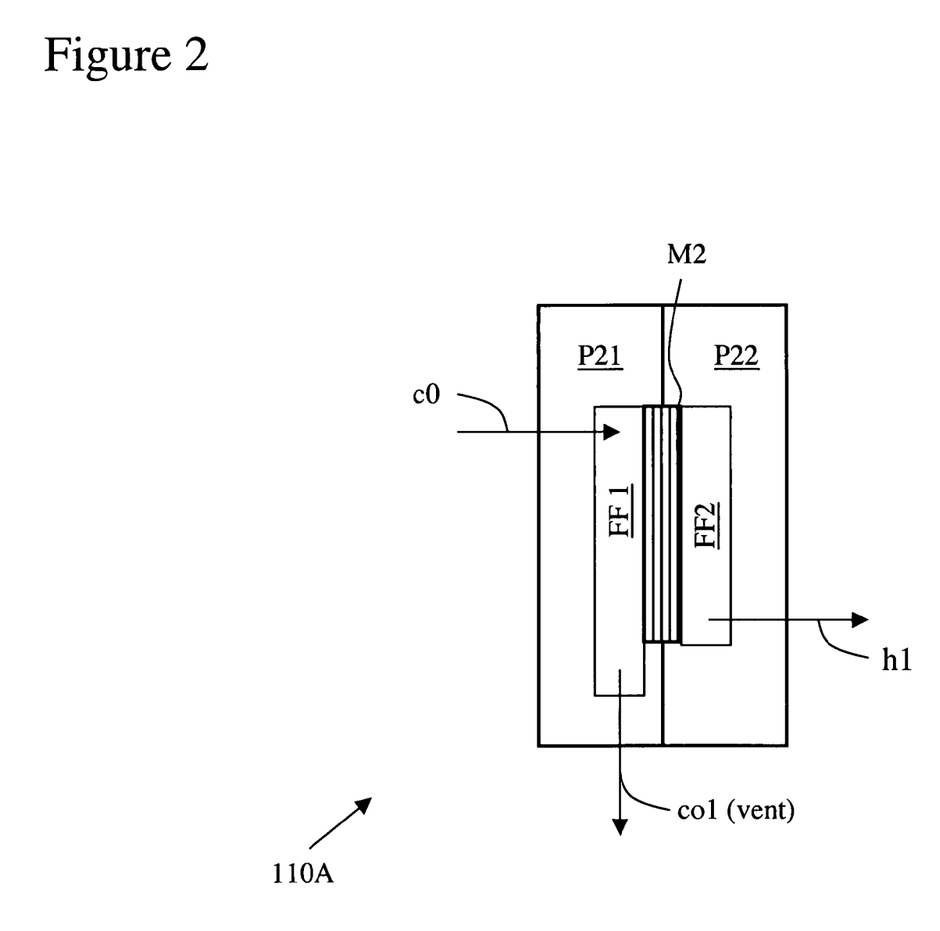
FIGS. 2-3 show exemplary embodiments of a water management module with plates, a membrane permeable to water vapor, holes and flow according to the present invention.
Figure 3:
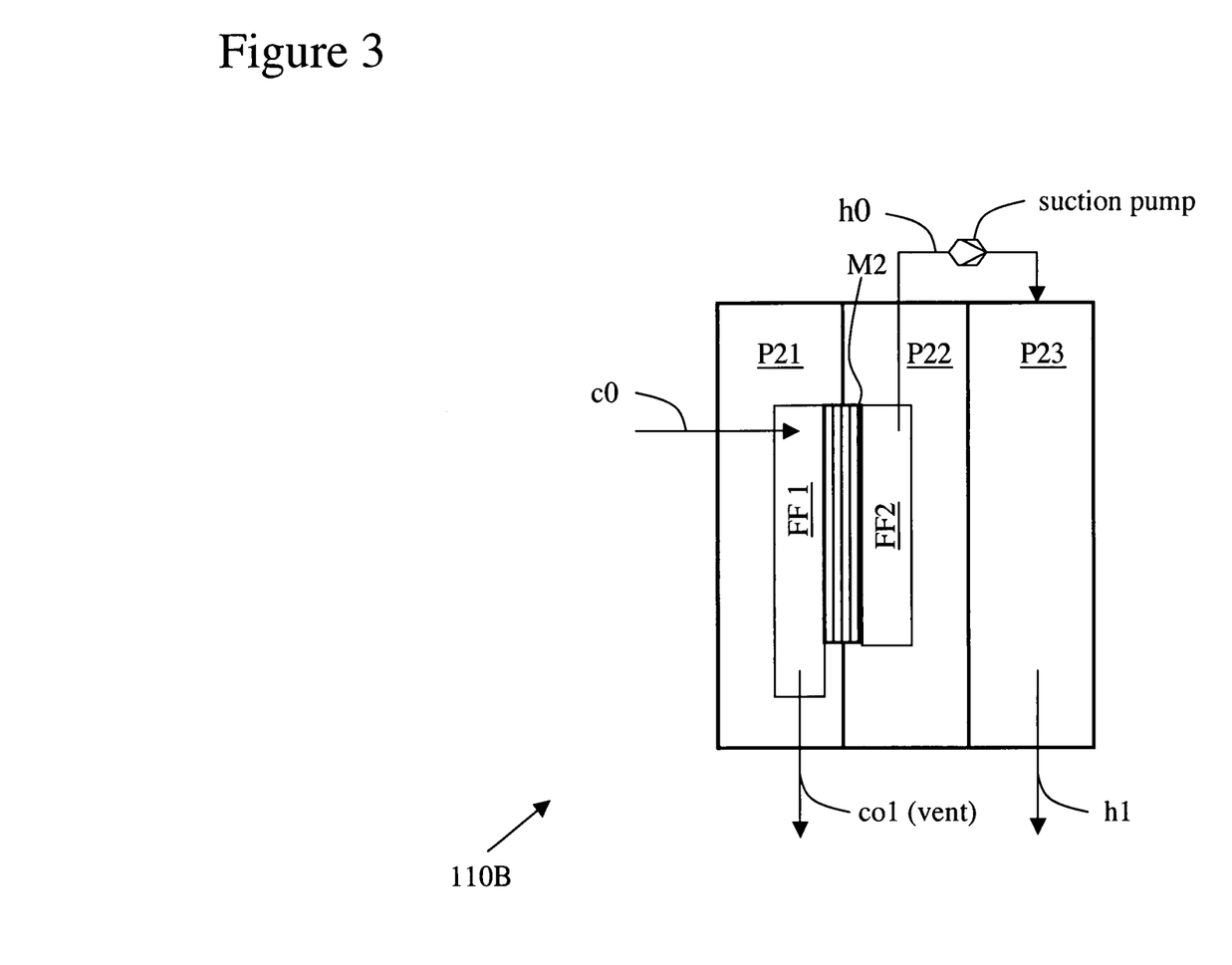
Figure 4:
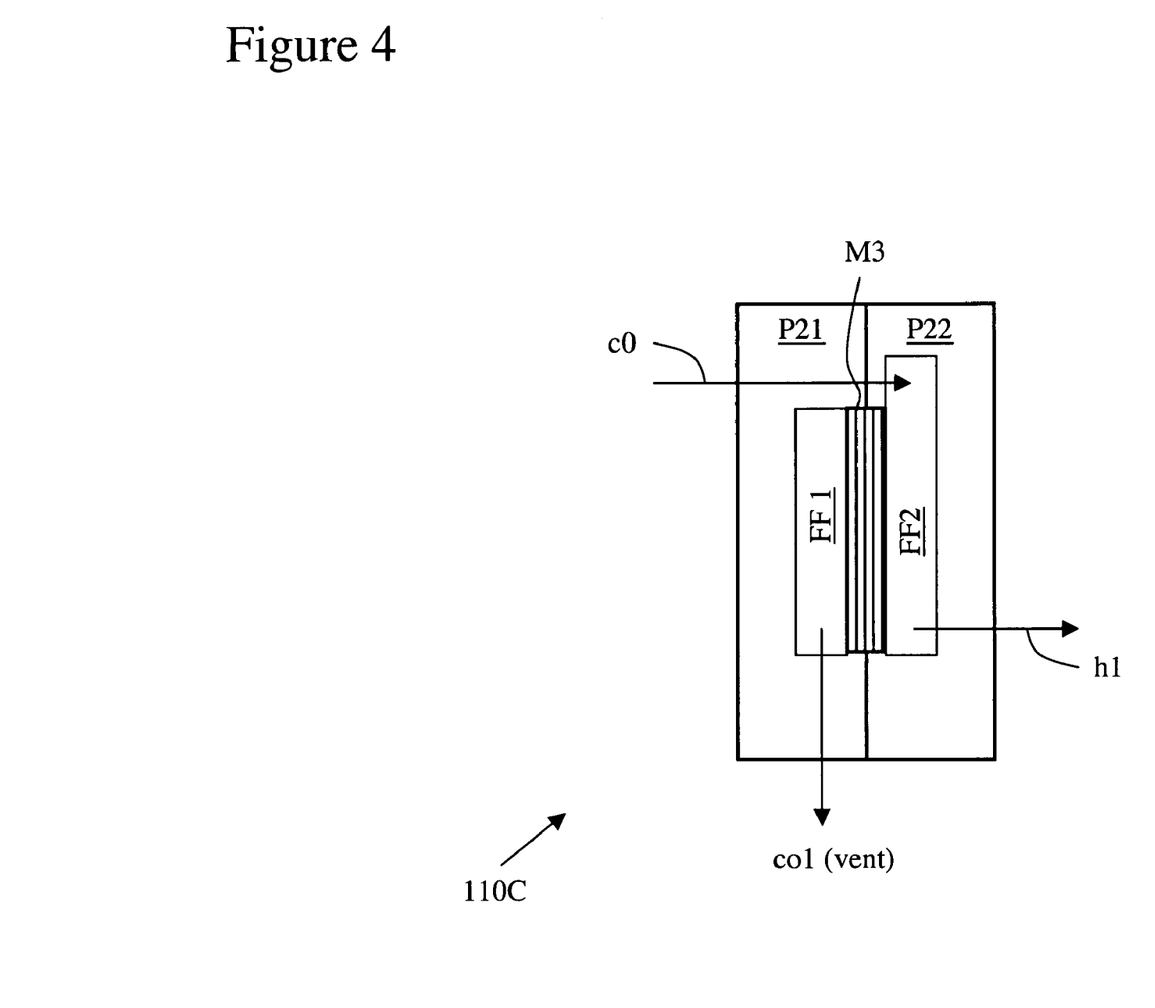
FIG. 4 shows an exemplary embodiment of a water management module with plates, a membrane permeable to air, holes and flow according to the present invention.
Figure 5:
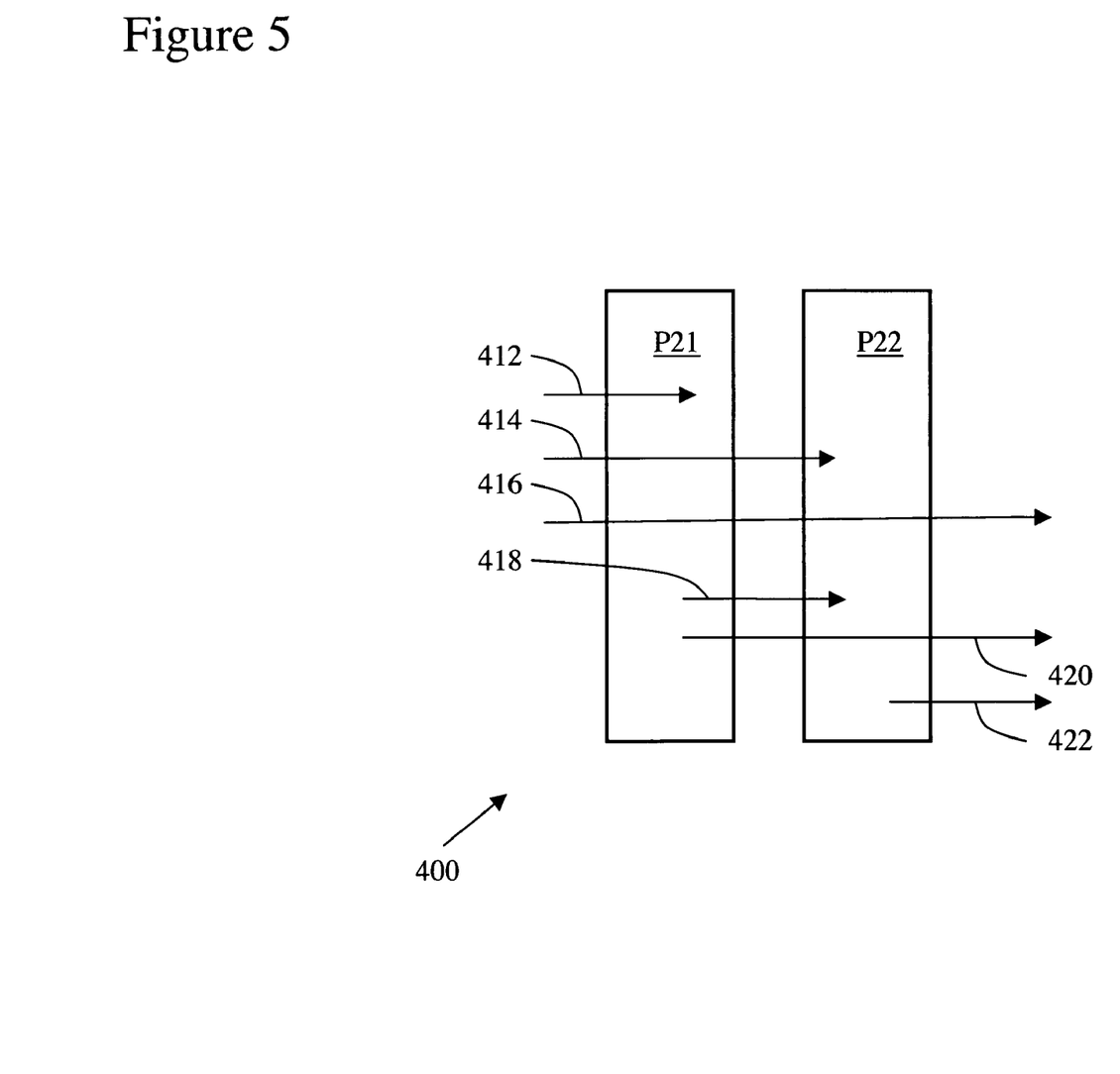
FIG. 5 shows an example of different types of holes according to the present invention.

FIG. 1 shows an overview of a direct methanol fuel cell system 100 with a water management device 110. System 100 further includes a direct methanol fuel cell stack 120, and preferably a carbon dioxide separation device 130, a methanol source 140 and/or a mixing device 150. Water management device 110 has a set of plates. In a first and second embodiment, the device has two plates or at least two plates (e.g. three plates). The plates are preferably sandwiched together. In both embodiments a membrane is enclosed by two plates whereby the membrane is either permeable to water vapor (air dehydration membrane) or permeable to air. The plates include a flow field (FF1, FF2) facing and in contact with the membrane as shown in FIGS. 2-4. In other words, the membrane is a barrier between the two flow fields. The goal of water management device 110 is to recover water that is then used for methanol dilution in mixing device 140.

Water Vapor Permeation Membrane

In a first embodiment shown in FIG. 2 the function of the module with plates P21 and P22 and membrane M2 is to separate and recover water from air in the cathode exhaust stream c0 utilizing membrane M2. In light of this invention this module is referred to a water management device (see also FIG. 1).

The cathode output stream c0 of the direct methanol fuel cell stack enters and flows through a flow field of plate P21 (e.g. grooves etched or machined on the inside face of plate P21) where c0 is in contact with an air dehydration membrane M2. Membrane M2 performs two functions:

(i) M2 is a selective air dehydration membrane permitting only water vapor to pass through it and restricting the flow of air or liquid water in c0 to pass through it. In one embodiment, a small low power suction pump could be used to create a vacuum or a pressure differential across the membrane M2 to facilitate the selective transport of water vapor as shown in FIG. 3; and (ii) M2 acts as a barrier between plates P21 and P22.

Examples of air dehydration membranes suitable as M2 are for instance, but not limited to, Cactus™ (PRISM™) membrane available from Air Products and Chemicals or an air dehydration membrane available from Balston Inc. or Parker Hannifin. These membranes typically have a flux for water vapor as defined by the following equation developed by Air Products Inc.:

$$N_{wv} = P_i/L = (300 \text{ to } 1500) \, 10^{-6} \, \text{cm}^3/\text{cm}^2.\text{s.cmHg}$$

where $N_{wv}$ is the flux of water vapor through the membrane, $P_i$ is the permeability of water vapor through the membrane, and L is the thickness of the membrane.

At plate P21, air in stream c0 is vented out. The idea behind extracting water vapor from c0 is to provide an adequate supply of liquid water for dilution of the pure methanol from the methanol reservoir on the fuel (anode) side. FIG. 2 shows water vapor that passes through membrane M2 to plate P22 and exits as h1 in case P22 provides an environment or condition for the water vapor to condense to liquid water h1. In another case a third plate P23 could be added as shown in FIG. 3. The water vapor in c0 that passed through membrane M2 to plate P22 exits as h0 and then to plate P23. The water vapor in stream h0 condenses to liquid water due to the phenomena of over-saturation in plate P23; the separation of air from the water vapor leads to an increase in the vapor pressure of water vapor thus leading to condensation of water vapor in plate P23. The liquid water thus produced is then pumped by means of a water pump from P23 as stream h1, i.e. the water condensate stream. Between plates P22, P23 a suction pump could be added to create a delta pressure between plate P21 and plate P22 to facilitate water vapor permeation through membrane M2. The pump also assists in pumping the output of plate P22 to plate P23.

Air Permeation Membrane

In the second embodiment, cathode output stream c0 enters the flow field of plate P22 (e.g. through grooves etched or machined on the inside face of plate P22) where c0 is in contact with membrane M3. Membrane M3 performs two functions namely:

(i) Membrane M3 is a selective permeable membrane that permits only air to pass through it and restricts the transport of any water vapor or liquid water through it (this in contrast to membrane M2 described with respect to FIGS. 2-3). A pressure differential across membrane M3 is responsible for the air passage. In one example the pressure differential across membrane M3 is about 0.5 to 0.75 psi, however, the present invention is not limited to this pressure range and could be in any range as long as the air passage and extraction occurs.

(ii) Membrane M3 acts as a barrier between plate P21 and plate P22.

Air passes through membrane M3 to plate P21 and is vented out from plate P21 as c01. The water vapor in stream c0 condenses to liquid water due to the phenomena of over-saturation. The permeation of air across the membrane M3 leads to an increase in the vapor pressure of water vapor in the mixture in P22. This increase in the water vapor pressure is the driving force for over-saturation and the resultant condensation of water vapor to liquid water. The liquid water thus produced from the separation of air from stream c0 is then pumped by means of a water pump from plate P22 to plate P31 as stream h1, i.e. the water condensate stream. The function of plates P21 and P22 and membrane M3 is essentially to separate and recover water from air in the cathode output stream c0 by utilizing membrane M3. In light of this invention this module is also referred to a water management device (see also FIG. 1).

Plates

The plates for the water management device could be constructed from a variety of materials such as metal, stainless steel, graphite or any other thermally conductive material with sufficient tensile strength. The flow fields of the plates could be established by grooves etched or machined on its face for fluid flow as discussed supra. Methods to construct the plates and flow fields are known in the art.

The plates, flow fields, or plates and flow fields require holes for entry of a stream (access holes), for passage of stream from one plate to the another (through holes) and for exiting of a stream (exit holes). An access hole is used for cathode input stream c0 in FIGS. 2-4. In FIGS. 2-3 this access hole goes through plate P21 and allow c0 to get to flow field FF1 of plate P21. In FIG. 4 this access hole goes through plates P21 (via a through hole; see also infra) and allows c0 to get to flow field FF2 of plate P22. An example of an exit hole is one originating from flow field FF1 of plate P1 to output stream c01 as shown in FIGS. 2-4. Another example of an exit hole is one originating from flow field FF2 of plate P22 to output stream h1 as shown in FIGS. 2-4.

Figure 7:
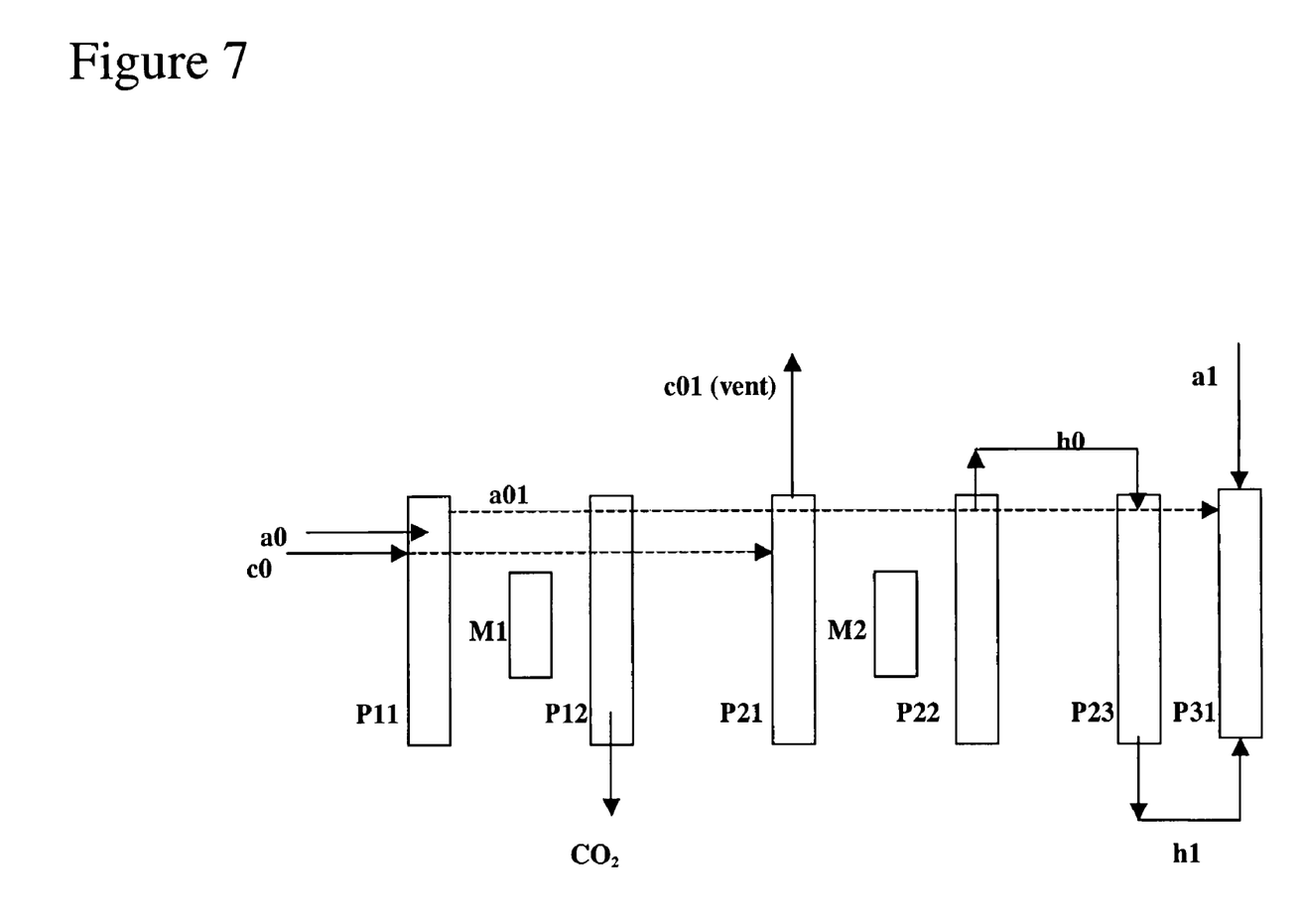
FIG. 7 shows a design architecture of a compact multi-functional module (CMM) according to example 1 in FIG. 6.
Figure 9:
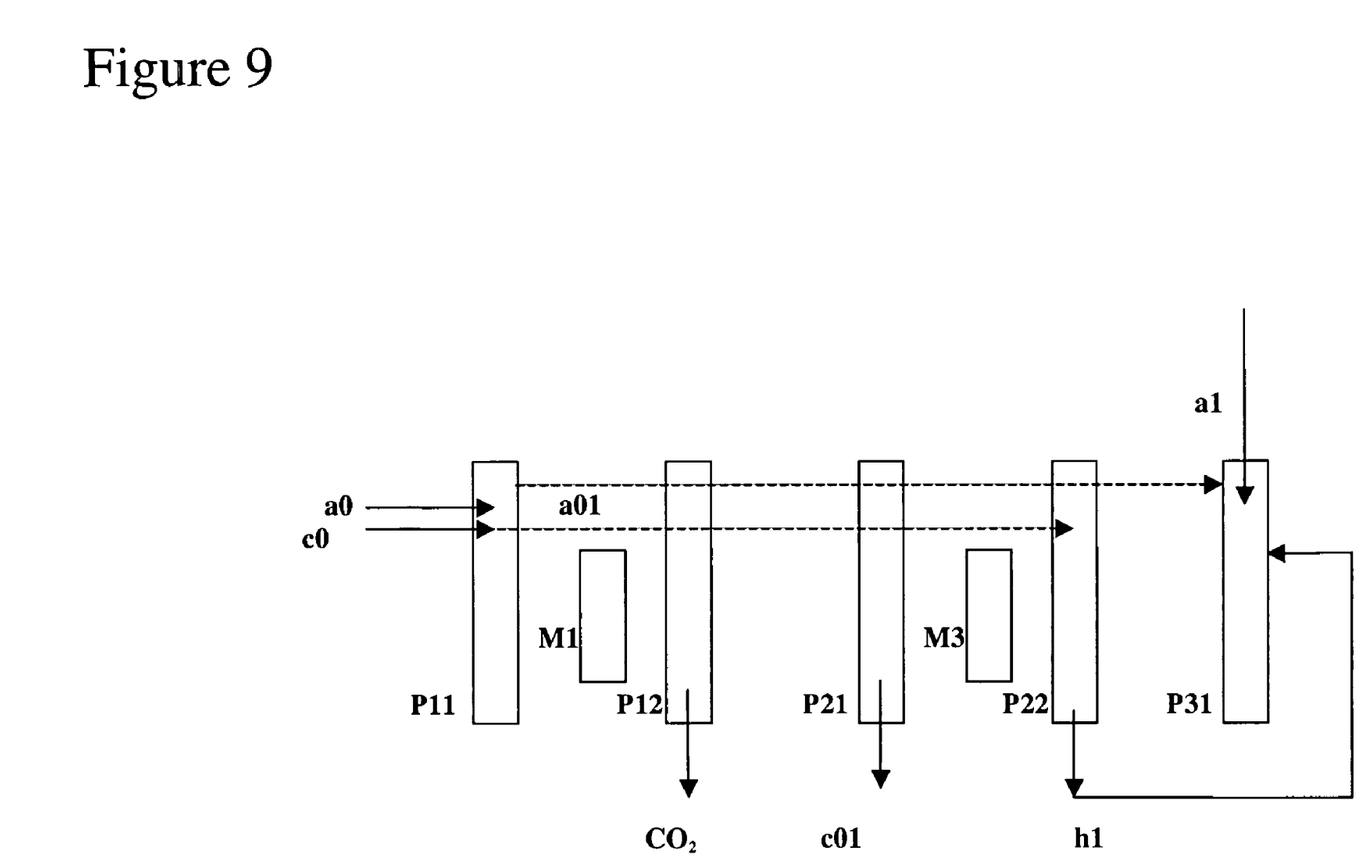
FIG. 9 shows a design architecture of a compact multi-functional module (CMM) according to example 2 in FIG. 8.
Figure 11:
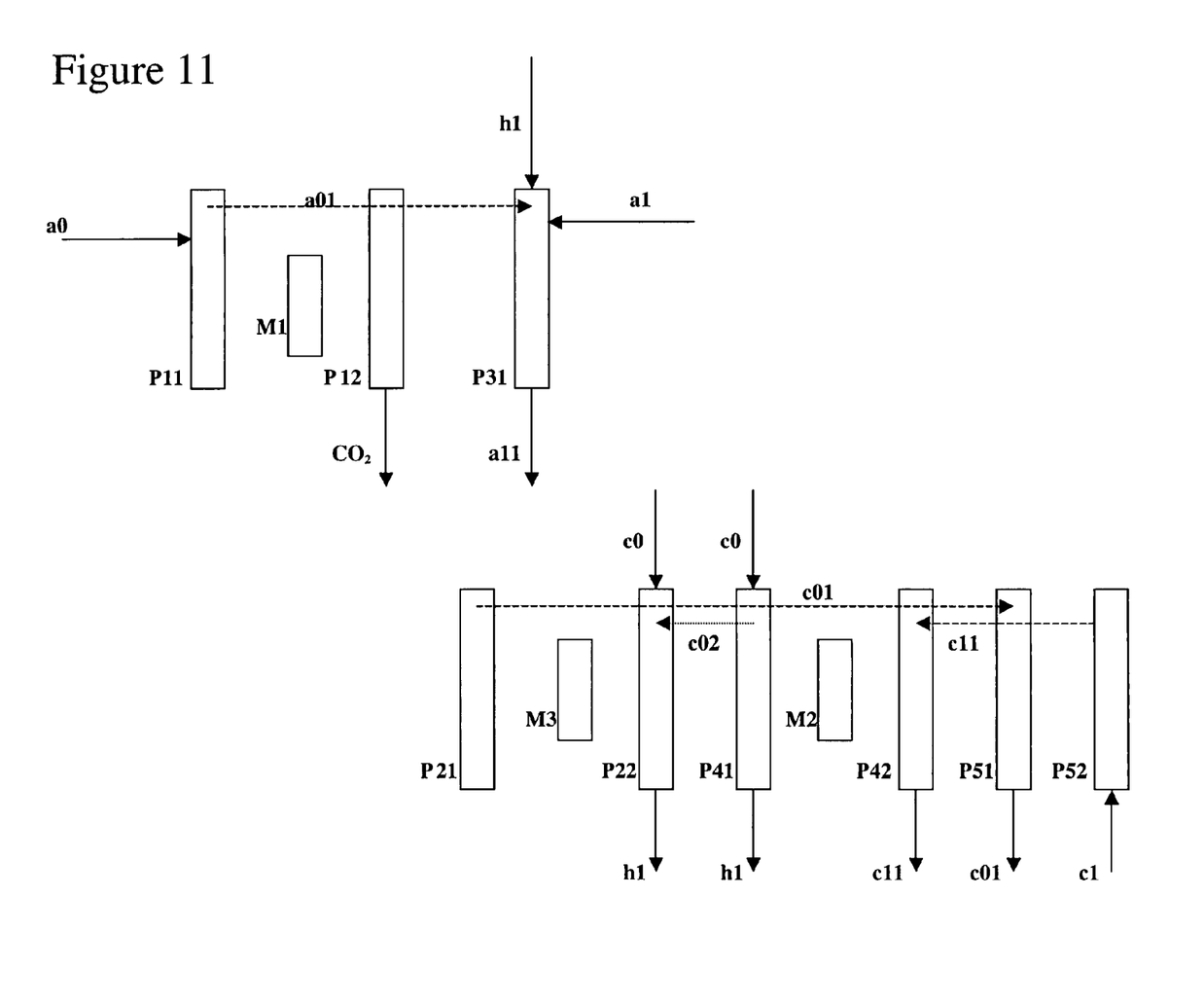
FIG. 11 shows a design architecture of a compact multi-functional module (CMM) according to example 3 in FIG. 10.

In one embodiment output stream h1 could be directed to mixing device 150 as shown in FIG. 1. In another embodiment, the input and/or output streams via respectively access and exit holes could pass through one or more plates as shown in FIGS. 7, 9 and 11. In general, each plate such as plates P21, P22 could have access, through and exit holes indicated by lines 412-422 to allow a particular stream to access, to pass or to exit the particular plate(s).

In a direct methanol fuel cell system with a plurality of plates that are stacked together it makes sense to have cathode output stream go through plates P21, P22 (and P23) to access another plate in the stack as discussed infra.

In a preferred embodiment plates P21, P22 (and/or P23) are stacked as a compact module, creating a compact water management module. In one example, the size of such a compact water management module could be about 9"×6"×½" (about 27 cubic inches). In this example each plate could then have a thickness of about ¼", i.e. two plates. In another example, with three plates of ¼" thick the compact water management module could be about 9"×6"×¾" (about 40 cubic inches). In still another example, with four plates of ¼" thick, e.g. as described with respect to FIGS. 10-11, the compact water management module could be about 9"×6"×1" (about 54 cubic inches). In general, the individual measurement could vary, but the volume of the water management module would still typically be lower than about 27, 40 or 54 cubic inches (or significantly lower). A person of average skill in the art would readily appreciate that currently available techniques make it possible to manufacture much smaller modules than 27, 40 or 54 cubic inches respectively, all of which are part of the scope of the invention.

In another embodiment, such a compact water management module is stacked with the direct methanol fuel cell stack, creating a compact multi module (CMM). In yet another embodiment, the carbon dioxide separation device and mixing device are constructed with plates therewith additionally creating compact modules. All together these compact module of the fuel cell stack, carbon dioxide separation water management and mixing could create another CMM. The following description includes different examples of how the water management device/module could be integrated in a direct methanol fuel cell system. This system could include a carbon dioxide separation device/module, an air supply system, a mixing device/module and a methanol source.

EXAMPLE 1

Figure 6:
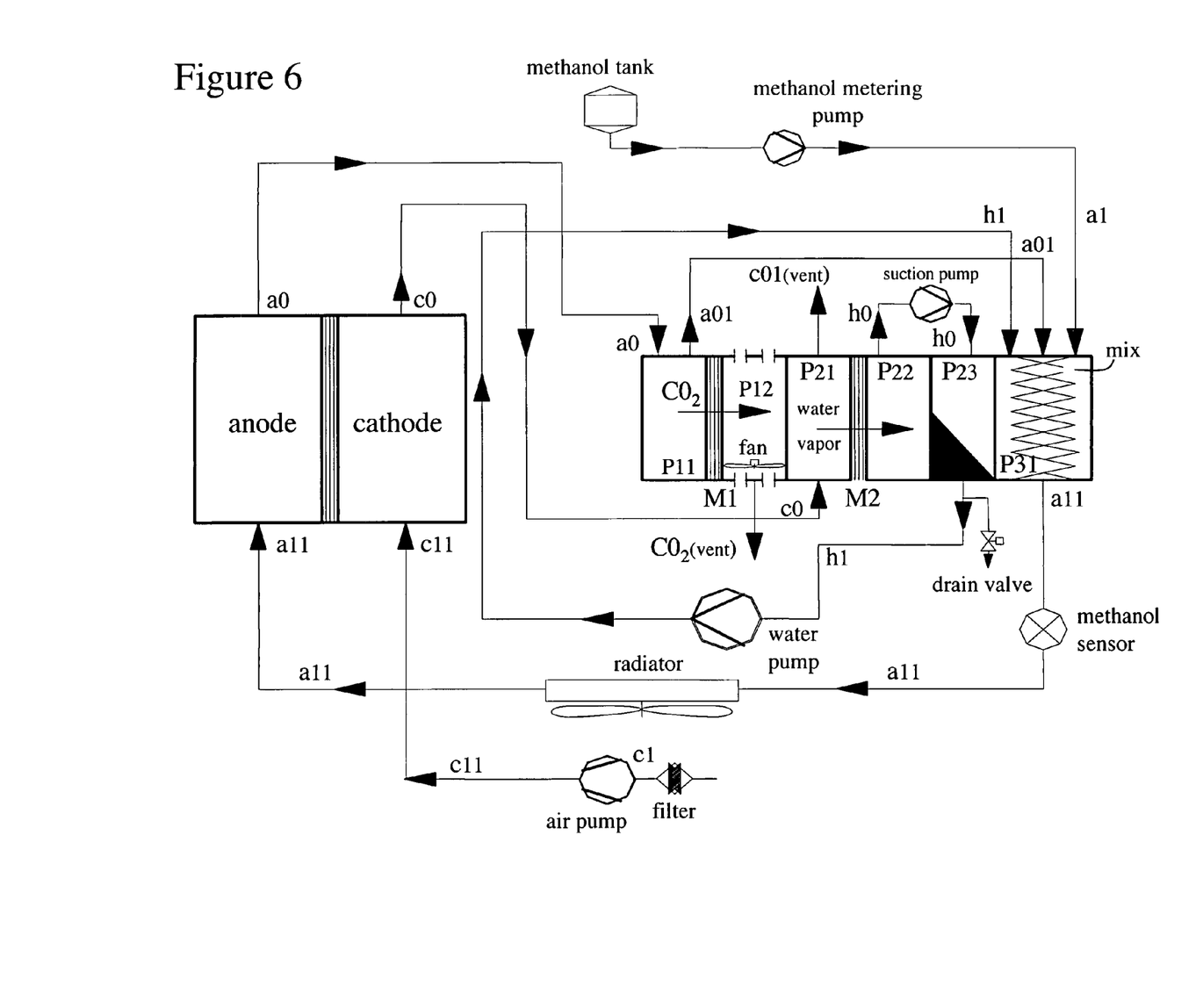
FIG. 6 shows example 1 of a DMFC system according to the present invention.

FIGS. 6-7 show an example of an approach for implementing the critical functions of water recovery from the cathode exhaust based on the first embodiment of the water management device/module with a membrane permeable to water vapor, carbon dioxide separation from the anode output stream, dilution of incoming concentrated methanol and thermal management in a direct methanol fuel cell. The individual components or modules are described without a particular preference in order. In addition, the description of the water management device/module is not repeated infra and readers are referred to the description supra.

1.1 Carbon Dioxide Separation

FIGS. 6-7 show a carbon dioxide separation device with a set of plates, typically two plates P11 and P12, sandwiched together. Plates P11 and P12 enclose a membrane M1 that is permeable to carbon dioxide. Each plate P11 and P12 also has a flow field similar to the plates of the water management device. The flow field faces and is in contact with the membrane M1. In other words, membrane M1 is a barrier between the two flow fields.

The flow field of plate P11 receives an anode output stream a0 of direct methanol fuel cell stack 120. This anode output a0 stream typically contains carbon dioxide, unused methanol and unused water. The carbon dioxide present in stream a0 is produced as a result of the electrochemical oxidation reaction occurring at the anode. The temperature of the stream a0 is around the temperature of the direct methanol fuel cell stack (+/−2 degrees Celsius) and therefore stream a0 is responsible for carrying a significant amount of heat generated at the stack.

The key idea of membrane M1 is that is it permeable to carbon dioxide, substantially restrictive to other gases than carbon dioxide and substantially restrictive to liquids present in the anode output stream a0. The driving force for carbon dioxide permeation through the membrane M1 is the difference in the partial pressures of carbon dioxide across the membrane M1, i.e. the carbon dioxide partial pressure in plate P11 is higher than in plate P12. In one embodiment, the membrane may require a pressure differential of around 0.1 to 0.5 psig.

Examples of suitable membranes include hybrid membranes of polymer and ceramics as well as hydrophobic microporous membranes. The idea behind using a hybrid membrane is to have a membrane that would not only have a higher permeability for carbon dioxide but also have a high selectivity towards carbon dioxide, which is shown by quite a few hybrid membranes prepared by a combination of sol-gel reaction and polymerization. Examples of suitable membranes are for instance, but not limited to, diphenyldimethoxysilane (DPMOS), trimethoxysilane (TMOS), phenyltrimethoxysilane (PTMOS), poly(amide-6-b-ethyleneoxide) and silica, aminopropyltrimethoxysilane (APrTMOS), silica-polyimide on alumina, or the like. A typical flux of carbon dioxide of the membrane is in the range of $10^{-6}$ to $10^{-7}$ mol/m$^2$-sec-Pa. A person of average skill in the art would appreciate that other kinds of membranes could have a different flux range, which would still be within the scope of this invention.

The anode output stream membrane M1 flows through flow field, whereby the carbon dioxide permeates through membrane M1. At the other end of this flow field the original anode output stream is left with unused methanol and unused water, i.e. substantially without carbon dioxide. The unused methanol and unused water exits from the flow field as output a01. Output a01 could be used in a mixing device where it could be mixed with methanol fuel from methanol source 140 and water from water management device 130. This mixture from mixing device 150 could then be used as an anode input stream a11 to direct methanol fuel cell stack 120. At the other the flow field of plate P12 of the carbon dioxide device the permeated carbon dioxide is collected and vents from the flow field through an exit hole as $CO_2$ (vent) to the open air.

1.2 Air Supply

An air supply subsystem is added to provide the oxygen c11 to the cathode(s) to satisfy the electrochemical demand in a direct methanol fuel cell stack. The stack has an oxygen requirement in addition to the oxygen consumed by the electrochemical current producing reaction. Methanol being a small, completely water miscible molecule has a tendency to migrate from the anode side (fuel side) over to the cathode side (air side) of the cells. This crossover methanol burns on the cathode catalyst producing an additional oxygen demand, additional waste heat, and additional water in the stack. The function of the air supply subsystem is multifold, i.e. (i) to provide oxygen to the cathode(s), (ii) control the water level in the stack by removing the water produced by the fuel cell reaction and crossover, and (iii) remove waste heat from the stack.

Air c11 at ambient conditions is fed by means of an air pump to the cathode of the direct methanol fuel cell stack. The air could have first passed through an air filter before feeding into the air pump. C11 provides oxygen for the electrochemical reduction reaction occurring at the cathode as well as for the reaction with any methanol crossing over to the cathode across the membrane. The unused air saturated with water vapor and some liquid water exits the direct methanol fuel cell stack as cathode output stream c0, typically at temperatures around the operating temperature of the stack. The temperature of the direct methanol fuel cell stack can range anywhere from 40 degrees Celsius to 80 degrees Celsius. The water vapor and liquid water present at the cathode side of the direct methanol fuel cell stack are a result of both the water producing oxygen reduction reaction occurring at the cathode as well as due to the water crossover from the anode side to the cathode across the membrane electrolyte.

1.3 Mixing Device

Plate P31 is an example of a mixing device, which has a reservoir accessible by three inputs. The first input is stream a01 from the carbon dioxide separation module, which enters plate P31. The second input is stream h1 from plate P23 that is fed into plate P31 by means of a water pump as described supra. Additionally, the third input is a stream of fresh methanol or neat methanol namely a1 fed from a methanol tank by means of a metering pump into plate P31. Plate P31 is a passive mixing device or a compartment where h1, a01 and a1 are mixed with the purpose of diluting the incoming neat methanol stream a1 prior to its being fed into the anode side of the stack as a11. Plate P31 is also used for another function, i.e. thermal management since stream a01 is the primary carrier of heat generated at the anode. A majority of this heat is used to thermally condition or raise the temperature of methanol stream a1, since this is typically at room temperature. This process ensures that the temperature of the stream a11 exiting from plate P31 is close to that of the temperature of the direct methanol fuel cell stack. If necessary, one could add a small radiator fan for cooling stream a11.

1.4 Compact Multi-Functional Module

FIG. 7 shows an example of constructing a compact multi-functional module system for a direct methanol fuel cell system. This design includes various plates, membranes and holes, such as:

1. Plate P11 with an access hole for a0.
2. Plate P11 and plate P12 with a through hole to allow the passage of c0.
3. Plate P11 with an exit hole for a01.
4. Plates P12, P21, P22 and P23 with a through hole to allow the passage of a01.
5. Plate P12 with an exit for carbon dioxide ($CO_2$).
6. Plate P21 with an access hole for c0.
7. Plate P21 with an exit hole for c01.
8. Plate P22 with an exit hole for h0.
9. Plate P23 with an access hole for h0.
10. Plate P23 with an exit hole for h1.
11. Plate P31 with an access hole for a01, h1 and a1.
12. Plate P31 with an exit hole for a11.
13. Plate P11 with a flow field (e.g. grooved inside face) for flow of a0 and a01.
14. Plates P12 with a flow field (e.g. grooved inside face) for flow of carbon dioxide ($CO_2$).
15. Plate P21 with a flow field (e.g. grooved inside face) for flow of c0 and c01.

16. Plate P22 with a flow field (e.g. grooved inside face) for flow of h0.

EXAMPLE 2

Figure 8:
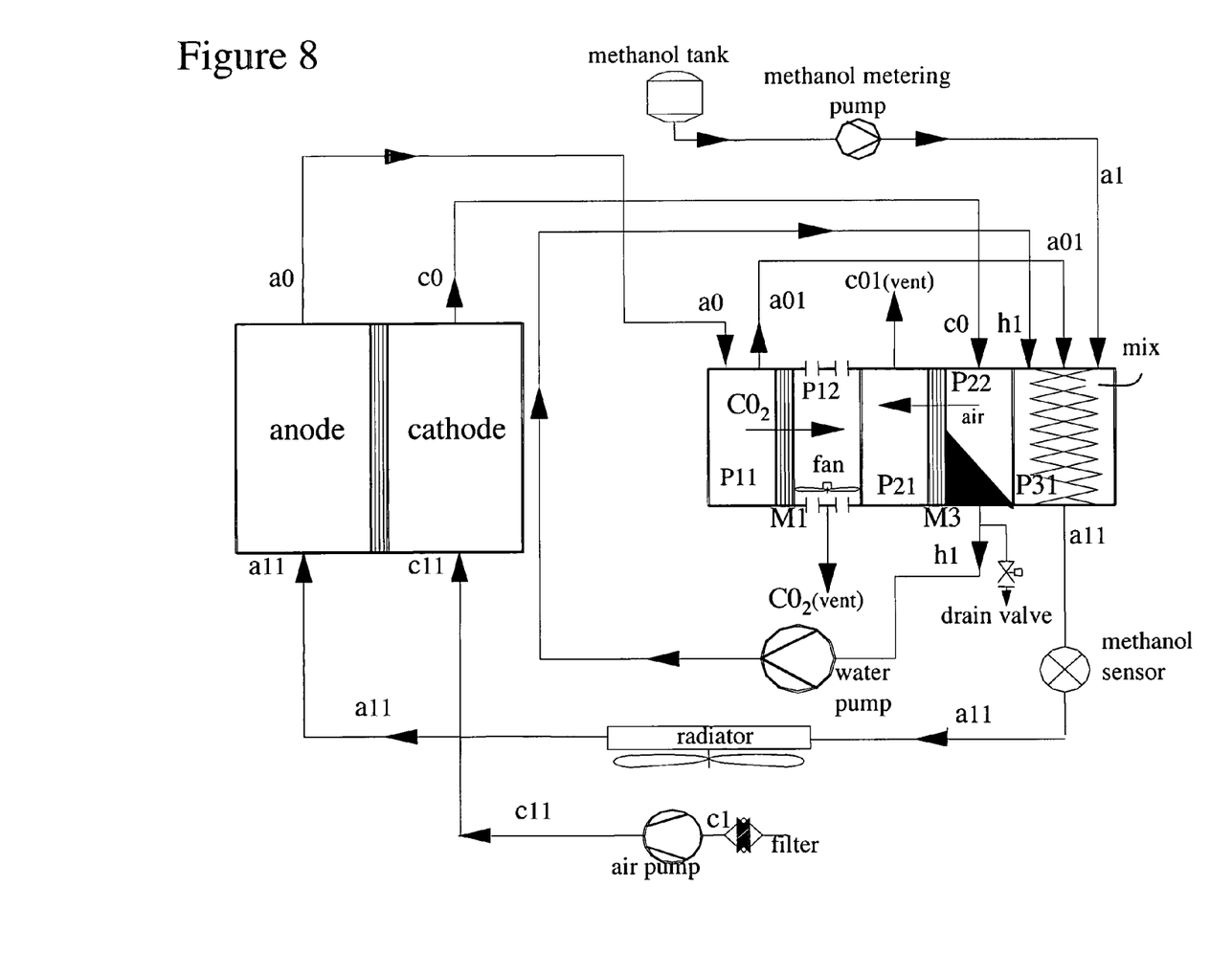
FIG. 8 shows example 2 of DMFC system according to the present invention.

FIGS. 8-9 show another example of an approach for implementing the critical functions of water recovery from the cathode exhaust based on the second embodiment of the water management device/module with a membrane permeable to air, carbon dioxide separation from the anode output stream, dilution of incoming concentrated methanol and thermal management in a direct methanol fuel cell. This example is a variation of example 1 with the difference in the recovery of water related to the water management device/module. For a description of the other components or modules the reader is referred to the description supra.

2.1 Compact Multi-Functional Module

FIG. 9 shows an example of constructing a compact multi-functional module system for a direct methanol fuel cell system. This design includes various plates, membranes and holes, such as:
1. Plate P11 with an access hole for a0.
2. Plates P11, P12 and P21 with a through hole to allow the passage of c0.
3. Plate P11 with an exit hole for a01.
4. Plates P12, P21 and P22 with a through hole to allow the passage of a01.
5. Plate P12 with an exit hole for carbon dioxide ($CO_2$).
6. Plate P21 with an exit hole for c01.
7. Plate P22 with an access hole for c0.
8. Plate P22 with an exit hole for h1.
9. Plate P31 with an access hole for a01, h1 and a1.
10. Plate P31 with an exit hole for a11.
11. Plate P11 with a flow field (e.g. grooved inside face) for flow of a0 and a01.
12. Plates P12 with a flow field (e.g. grooved inside face) for flow of carbon dioxide ($CO_2$).
13. Plate P21 with a flow field (e.g. grooved inside face) for flow of c01.
14. Plate P22 with a flow field (e.g. grooved inside face) for flow of c0 and h1.

EXAMPLE 3

Figure 10:
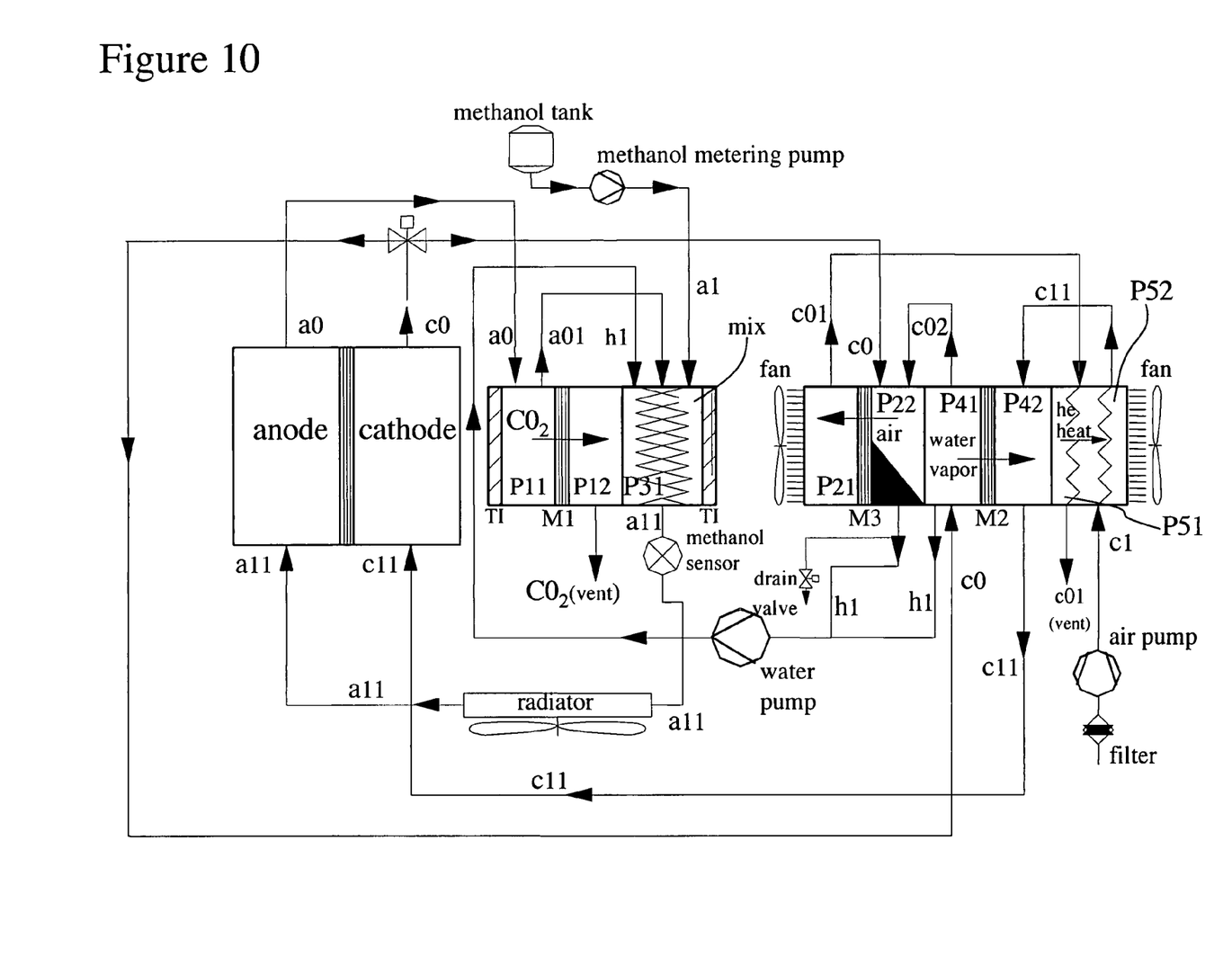
FIG. 10 shows example 3 of DMFC system according to the present invention.

FIGS. 10-11 show yet another example of an approach for implementing the critical functions of water recovery from the cathode exhaust with the first and second embodiment of the water management device/module integrated in the system, carbon dioxide separation from the anode output stream, dilution of incoming concentrated methanol and thermal management in a direct methanol fuel cell. In addition, other variations are added that are described infra. For a description of the other components or modules the reader is referred to the description supra.

3.1 Variations

A first variation relates to the carbon dioxide separation module, which could be stacked with plate P31 that serves as a (passive) mixing device in a similar fashion as in example 1 and 2. In addition, at either side of this compact multi-functional module of plates P11, P12 and P31 thermal insulators TIs could be added to prevent heat loss through radiation from stream a01.

A second variation relates to the water management to employ both solutions from example 1 and 2. FIGS. 10-11 show the cathode output stream c0 from direct methanol fuel cell stack (i.e. unused air saturated with water vapor and liquid water at temperatures close to that of the stack) split up into two streams c0 using a flow control valve. A first stream of c0 is fed into plate P41. The combination of plates P41 and plate P42 and membrane M2 is similar to the water management module in example 1. The difference is that plate P23 is omitted in example 3 and the output stream c11 of plate P42 now directly feeds to the cathode input of the direct methanol fuel cell stack. A second stream of c0 is fed into plate P22. The combination of plates P21 and plate P22 and membrane M3 is similar to the water management module in example 2. An additional note is that the air in stream c0 permeates through membrane M3 to plate P21 where and exits as stream c01.

A third variation also relates to the water management module, whereby plate P22 could be cooled to condense the vapor and thus separate the air from the recovered water. Condensation would be a result of cooling provided by forced air-cooling fans as well as a result of over-saturation. Over-saturation would occur since the water vapor pressure in P22 would increase due to the separation of air due to the introduction of c02. The cooling would be particularly beneficial in case a micro-porous hydrophobic type of membrane M3 is used.

A fourth variation relates to humidification and thermal conditioning. Stream c1 is fresh air introduced into the system by means of an air pump into plate P52. Additionally an air filter could be used before entering the air pump. Stream c1 is passed through an air-to-air heat exchanger (plates P51 and P52) where it is thermally conditioned by stream c01 that originates from plate P21. After the thermal conditioning process stream c01 is vented into the atmosphere as c01 (vent). The thermally conditioned stream of air exits as c11 and is passed through plate P42 where it is in contact with membrane M2. Membrane M2 humidifies stream c11 using the water from c0. The thermally conditioned and humidified air stream exits from plate P42 as stream c11 and is introduced into the cathode for the electrochemical reduction reaction. Meanwhile, the dehumidified stream c0 in P41 exits as c02 and is introduced into plate P22. In addition, radiator fans could be used, e.g. at the side of plates P51 and P21 to provide thermal regulation.

3.2 Compact Multi-Functional Module

FIG. 11 shows an example of constructing a compact multi-functional module system for a direct methanol fuel cell system. This design includes various plates, membranes and holes, such as:
1. Plate P11 with an access hole for a0.
2. Plate P11 with an exit hole for a01.
3. Plate P12 with a through hole to allow the passage of a01.
4. Plate P12 with a grooved inside face for flow of carbon dioxide ($CO_2$).
5. Plate P31 with an access hole for a01, h1 and a1.
6. Plate P31 with an exit hole for a11.
7. Plate P22 with an access hole for c0.
8. Plate P21 with an access hole for c01.
9. Plates P22 and P41 with an access hole for c0.
10. Plates P22 and P41 with an exit hole for h1.
11. Plate P41 with an exit hole for c02.
12. Plate P22 with an access hole for c02.
13. Plates P22, P41, and P42 with a through hole to allow the passage of c01.
14. Plate P51 with an access hole for c01.
15. Plates P42 and P52 with an exit hole for c11.
16. Plate P51 with an exit hole for c01.
17. Plate P52 with an access hole for c1.
18. Plate P51 with a through hole for c11.
19. Plate P42 with an access hole for c11.

15. Plate P11 with a grooved inside face for flow of a0 and a01.
16. Plates P12 with a flow field (e.g. grooved inside face) for flow of carbon dioxide ($CO_2$).
20. Plate P21 with a flow field (e.g. grooved inside face) for flow of c01.
21. Plate P22 with a flow field (e.g. grooved inside face) for flow of c0 and h1.
22. Plate P41 with a flow field (e.g. grooved inside face) for flow of c0, h1 and c02.
23. Plate P42 with a flow field (e.g. grooved inside face) for flow of c11.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. In one variation, the plates with flow fields for the passage of the fluids could also be designed with fins for an efficient heat transfer mechanism. In another variation, prior to entering the anode of the direct methanol fuel cell stack, stream a11 could be passed through a small radiator for cooling. In yet another variation, the invention could be included in DMFC systems generating 1 kW or more since it would clearly overcome the size and efficiency problems with traditional condensor-based systems in this power range. However, the invention is not limited to such a power range and could also be integrated in DMFC systems of 50 W to 1 kW or, in general, to any type of power range or application. All such variations are considered to be within the scope and spirit of the present invention as defined by the following claims and their legal equivalents.

What is claimed is:

1. A direct methanol fuel cell system, comprising:
   (a) a direct methanol fuel cell stack;
   (b) a first plate in fluid communication with the cathode output stream of said direct methanol fuel cell stack, said cathode output stream containing water vapor, water and air;
   (c) a second plate in contact with a surface of said first plate, wherein said first plate and said second plate form a first membrane enclosure;
   (d) a membrane permeable to water vapor disposed in said first membrane enclosure and separating into a first flow field and a second flow field corresponding to said first plate and said second plate, wherein said membrane permeable to water vapor is a barrier between said first flow field and said second flow field permitting passage of said water vapor to pass from said first flow field to said second flow field, but restricting passage of said water and said air wherein said permeated water vapor collected in said second flow field of said second plate is in fluid communication with the input cathode stream of said direct methanol fuel cell stack;
   (e) a third plate in contact with a surface of said first plate, wherein said third plate having a condensation flow field (i) in contact with said first flow field of said first plate thereby receiving said water and said air, (ii) in fluid communication with said cathode output stream of said direct methanol fuel cell stack or a combination of said (i) and said (ii);
   (f) a fourth plate in contact with a surface of said third plate, wherein said third plate and said fourth plate form a second membrane enclosure; and
   (g) a membrane permeable to air disposed in said second membrane enclosure and separating into a third flow field and a fourth flow field corresponding to said third plate and said fourth plate, wherein said third flow field is in fluid communication with said cathode output stream, wherein said membrane permeable to air is a barrier between said third plate and said fourth plate permitting passage of said air from said third flow field to said fourth flow field, but restricting passage of said water.

2. The direct methanol fuel cell system as set forth in claim 1, further comprising a fifth plate, wherein said fifth plate having a methanol-water mixing flow field in contact with (j) said first flow field of said first plate, (jj) said flow field of said third plate, or said (j) and said (jj).

3. The direct methanol fuel cell system as set forth in claim 1, further comprising a sixth plate in contact with a surface of said second plate, wherein said sixth plate having a first heat exchanger in contact with said fourth flow field of said fourth plate.

4. The direct methanol fuel cell system as set forth in claim 3, further comprising a seventh plate in contact with a surface of said sixth plate, wherein said seventh plate having a second heat exchanger in contact with said second flow field of said second plate.

* * * * *